United States Patent Office 3,494,956
Patented Feb. 10, 1970

3,494,956
DEHYDRODIMERIZATION PROCESS
Phillip A. Greene, Petersburg, Edward J. Buyalos, Prince George County, and David E. Scheirer, Chesterfield County, Va., assignors to Allied Chemical Corporation, New York, N.Y., a corporation of New York
No Drawing. Filed Apr. 5, 1965, Ser. No. 445,795
Int. Cl. C07c *121/24, 55/10, 11/12*
U.S. Cl. 260—465.8        8 Claims

ABSTRACT OF THE DISCLOSURE

A product produced by dehydrodimerizing in the vapor phase a compound having a methyl group, the carbon atom of which is attached to another carbon atom which in turn is bonded by an unsaturated bond to an adjoining atom. The compound is contacted with a metal oxide selected from the group consisting of lead oxide, cadmium oxide, and thallium oxide at a temperature within the range of 300–800° C. whereby as product there is formed a dimer of the radical which is produced upon removal of a hydrogen atom from the methyl group of the starting compound, the dimerized radicals being linked through the carbon atoms of said methyl groups.

---

This invention relates to the coupling of methyl group-containing compounds by removal of a hydrogen atom from the methyl group of each molecule of the compound and linking of the resulting free radicals.

Dehydrodimerization of certain compounds is known to occur in the presence of hydrogen peroxide, an expensive compound, with low yield in the dehydrodimerized product due to the production of considerable amounts of by-products.

In accordance with the present invention a compound in the vapor phase, the compound having a methyl group the carbon atom of which is attached to another carbon atom which in turn is bonded by an unsaturated bond to an adjoining atom, is contacted with an oxide of at least one metal of the group consisting of lead, cadmium and thallium, at a temperature between 300° C. and below the temperature at which the dehydrodimerization product decomposes, usually not higher than 800° C., whereby as product there is formed the dimer of the radical which is produced upon removal of a hydrogen atom from the methyl group of the starting compound, the dimerized radicals being linked through the carbon atoms of said methyl groups.

Oxygen can be furnished to the reaction together with the compound to be dehydrodimerized, or from the oxygen content of the oxides of the above-identified metals. According to yet another embodiment of the invention the reactor is filled with the metal which is at least partially oxidized by contacting it with oxygen prior to contact with the compound to dehydrodimerized.

In the preferred embodiment of the invention, for best efficiency, the reactor is packed with the oxides of either one, or a mixture of the above metals, and oxygen is mixed to the vapor of the compound to be dehydrodimerized. The amount of the oxygen in the mixture should preferably not exceed 10% by volume of the gas mixture and preferably should be at least 3% vol., to obtain high yields in the dehydrodimerization product.

The compounds to be dehydrodimerized in accordance with the invention have a terminal methyl group, and can be represented by the formula

Y—CH$_3$ where the carbon atom of the methyl group is attached to a carbon atom which in turn is bonded by an unsaturated bond to an adjoining atom. Examples of Y include vinyl radicals, substituted vinyl radicals of the formula

where R can be an alkyl or aryl group containing not over 10 carbon atoms, which can contain substituents, if these leave the group R unreactive, i.e. inert, under the reaction conditions. Other examples for Y include phenyl, cyano, and carboxyl groups.

In a preferred embodiment of the invention propylene is mixed with 5–10% by volume oxygen, based on the mixture which is then contacted with lead oxide to yield 1,5-hexadiene in accordance with the following equation

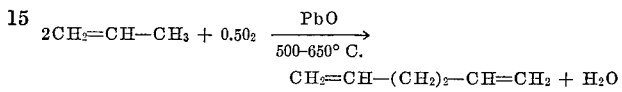

Since, if the process is not conducted under the optimum conditions, a major side reaction in accordance with the following formula $$2CH_2=CH—CH_3 + 9O_2 \rightarrow 6CO_2 + 6H_2O$$

can lead to the formation of CO$_2$, the oxygen should not be admixed in the stoichiometric proportions for the first one of the above two equations, but the oxygen concentration should not exceed 10% by volume of the propylene introduced to the reaction, and preferably should be between 3% vol. and 10% by volume of the mixture. Under these conditions high yields of the desired dehydrodimer can be obtained, based on the amount of propylene reacted. To recover the desired end product which in the reactor exit gas is mixed with major proportions of unreacted propylene, the exit gas is treated by known techniques, such as first freezing out the water content, then condensing the exit gas mixture and stripping the propylene from the diene, or scrubbing the mixture with No. 2 fuel oil to remove the diene from the propylene and, possibly, CO$_2$-containing mixture.

The oxide catalyst can be formed within the reactor by passing oxygen, or an oxygen-containing gas, such as air, in contact with the molten metal. The catalytic oxide can also be formed by the thermal decomposition of an oxygen-containing compound of the metal, such as its carbonate, or nitrate; finally, the catalytic oxide can also be formed by coprecipitating a precursor together with other metals such as silver, and then decomposing the metals to their oxides. The particular allotropic, isomorphic, or tautomer form of the catalytic oxide is not critical.

In the preferred embodiment of the invention the metal oxide is employed on a catalytic support, such as activated alumina having a high surface area, diatomaceous earth, or firebrick. Highly siliceous materials which would be easily fluxed by the metal oxide at the prevailing reaction temperatures should be avoided. Preferably at least 5×10$^{-3}$ mol metal should be used per cc. supported catalyst.

In the dehydrodimerization of certain compounds various exothermic effects may result in the formation of excess heat which has to be dissipated or even prevented. This problem can be adequately controlled by choosing an appropriate pressure, because the reaction is not markedly pressure sensitive. For practical reasons it is conducted preferably at a pressure between 1 and 10 atmospheres. Further heat control is provided by the possibility of varying the residence time within the reactor between wide limits, for practical reasons preferably between 0.02 and 10 seconds. A further measure of heat control can be accomplished by varying the amount of oxygen within the preferred limits. For highest yields the exit gas should not contain any oxygen.

The following examples set forth the best method contemplated for carrying out the present invention, but they are not to be interpreted as limiting the scope of the invention to all details of the examples. Percentages are by volume, and temperatures in ° C., unless otherwise specified. Unless otherwise specified, a stainless steel tubular reactor was employed in all examples. The longitudinal axis of the reactor was disposed vertically, the catalyst was contained by stainless steel screens, and the gases were conducted over the catalyst. Calculation of residence time is based on the gas being a perfect gas at the measured temperature; and the gas space in the reactor being one-half the catalyst bulk volume.

EXAMPLE 1

20–48 mesh activated alumina sold by Alcoa under the trademark H–151, was soaked, under vacuum, for about 10 minutes in a 1.5 molar aqueous solution of $Pb(NO_3)_2$, drained, and subsequently the lead nitrate was pyrolyzed to lead oxide by heating to about 700° in air until the evolution of the reddish brown $NO_2$ fumes stopped. The above procedure was repeated until the gain in weight indicated that the lead concentration has reached approximately $5 \times 10^{-3}$ mols Pb/cc. catalyst. This was acomplished in five treatments.

About 65% of the volume of a stainless steel tubular reactor was charged with the catalyst prepared in accordance with the above-described procedure. The reactor was electrically heated from the exterior and the temperature was monitored with a stainless steel-clad thermocouple inserted into the center of the catalyst bed.

A mixture of 94% proylene and 6% $O_2$ was passed through the reactor at 493° and 46 p.s.i.g., the gas mixture having a residence time of 0.04 second in the reactor. The exit gas was analyzed by gas chromatography, contained 2% 1,5-hexadiene, 3.8% $CO_2$, and over 94% propylene, on a water-free basis. Disregarding the small percentage of by-products other than $CO_2$, the yield of 1,5-hexadient, based on propylene consumed, was about 76%.

EXAMPLE 2

22% of the volume of a stainless steel tubular reactor was charged with lead oxide catalyst prepared as described in Example 1.

A gas mixture containing 95 mol percent propylene and 5 mol percent $O_2$ was introduced to the reactor at a pressure of 105 p.s.i.g. The temperature of the catalyst was 384°. The mixture had a residence time of 0.008 second in the reactor. The exit gas contained 0.66% 1,5-hexadiene, 2.2% $CO_2$, 0.5% $O_2$, the balance being substantially propylene, on a water-free basis. Disregarding the small percentage of by-products other than $CO_2$, the yield of 1,5-hexadient, based on propylene consumed, was 64%.

EXAMPLE 3

Molten lead was contacted with oxygen at a temperature between 500 and 560°. 20% of the volume of a stainless steel reactor was filled with the lead oxide thus formed, and the catalyst was heated to about 425°. Propylene gas was introduced into the reactor at a pressure of 14.7 p.s.i.g., providing about 2.5 sec. residence time in the reactor. The exit gas contained 0.43% 1,5-hexadiene, 0.68% $CO_2$, the balance being substantially unreacted propylene. Disregarding the small percentage of by-products other than $CO_2$, the yield of 1,5-hexadiene, based on propylene consumed, was about 79%.

EXAMPLE 4

95 volume percent of a stainless steel tubular reactor was filled with 11 parts by weight red lead, sold by Allied Chemical Corp. under the trademark of Baker & Adamson Reagent Code 1841. Propylene, as the only gas, was passed through the reactor under a pressure of 14.7 p.s.i.g., providing approximately 10 sec. residence time. The oxygen required for the reaction was obtained from the $Pb_3O_4$ catalyst itself. The exit gas was constantly analyzed and the yield, based on propylene reacted, was calculated, until a point where the catalyst appeared to be nearly exhausted. The following table shows the results obtained:

| Minutes after start | ° C. | Exit Gas Analysis, percent | | |
|---|---|---|---|---|
| | | $CO_2$ | $C_6H_{10}$ | Yield |
| 25 | 272–310 | 0.12 | 0.08 | 80 |
| 55 | 359–419 | 1.68 | 0.47 | 63 |
| 95 | 357–422 | 0.35 | 0.11 | 65 |
| 130 | 440–517 | 2.7 | 0.93 | 67 |
| 160 | 448–530 | 1.39 | 0.58 | 72 |
| 237 | 459–542 | 0.41 | 0.28 | 80 |

After 240 minutes 8.2 parts by weight metallic lead and 2.0 parts by weight of a lead oxide powder were recovered from the reactor.

EXAMPLE 5

Lead carbonate and silver carbonate were coprecipitated in a 1:1 mol ratio of Pb:Ag, from a 0.5 M Pb $(NO_3)_2$-0.5 M Ag $NO_3$ aqueous solution with a slight excess of 1.1 M $Na_2CO_3$, and the precipitated carbonates were thermally decomposed to their oxides at 450°. The dry mixture of oxides filled 40 percent of the volume of a stainless tubular reactor into which the mixture was charged.

A mixture of 92% isobutylene and 8% $O_2$ was introduced into the reactor under a pressure of 1 atm. for a 2 sec. residence time at 430–500°. The exit gas contained no oxygen, 5.4% $CO_2$, and 2.4% 2,5-dimethyl-1,5-hexadiene. Disregarding the small percentage of by-products other than $CO_2$, the yield of the diene, based on isobutylene consumed, was 79%.

EXAMPLE 6

A catalyst was prepared similarly to the catalyst of Example 1, except in this instance an aqueous solution of cadmium acetate was sprayed onto the catalytic support and then pyrolyzed to form a layer of cadmium oxide. 22 percent of the volume of a stainless tubular reactor was filled with the catalyst thus prepared, and then the reactor was heated in a tube furnace, the catalyst bed being located near the center of the furnace. A feed gas mixture of 6.4 mol percent oxygen and 93.6 mol percent propylene was passed through the reactor at atmospheric pressure, providing a residence time of 0.02 sec. The catalyst location of the reactor was held at 650°. The exit gas contained 1.05–1.15% 1,5-hexadiene, and 2.7% $CO_2$. The yield, based on propylene consumed, was 70–72%, discounting negligible amounts of by-products.

EXAMPLE 7

The catalyst was prepared similar to the catalyst of Example 1, except in this instance the support was coated with an aqueous solution of thallium nitrate, then dried and thermally decomposed to form a layer of about 50% by weight thallium oxide, based on the weight of the supported catalyst. 22 percent of the volume of stainless steel tubular reactor was filled with this catalyst which was heated to 500°. A gas mixture containing 93.7% propylene and 6.3% $O_2$ was passed over the catalyst at a pressure of 1 atmosphere gauge, providing a residence time of 0.02 sec. The exit gas contained 0.7% 1,5-hexadiene and 2.9% $CO_2$, the balance being substantially unreacted propylene. Discounting the negligible amounts of by-products other than $CO_2$, a yield of 59%, based on propylene reacted, was obtained.

EXAMPLE 8

A lead oxide catalyst containing $6.6 \times 10^{-3}$ mol Pb/cc. catalyst, prepared in the manner of the catalyst of Example 1, was charged into a stainless steel tubular reactor, filling 75 percent of the reactor volume. A gas mixture containing 92.4% α-methyl styreneand 7.6% oxygen was passed over the catalyst heated to a temperature of 575±150. The pressure of the gas mixture was 23 p.s.i.g. providing a residence time of about 0.03 sec. The reactor effluent contained 2,5-diphenyl-1,5-hexadiene, and unreacted α-methyl styrene and light fractions. The product was isolated by vacuum distillation and was identified by gas-liquid chromatography, melting point and infrared absorption spectrum.

EXAMPLE 9

A tubular stainless steel reactor was completely filled with the catalyst of Example 8, and a mixture of 93.8% toluene vapors mixed with 6.2% oxygen was passed over the catalyst heated at a temperature of 650±10°. The gases were introduced at atmospheric pressure providing a residence time of 0.01 sec. After the unreacted toluene and light fractions were removed from the effluent, by distillation, the residue was dissolved in chloroform. Bibenzyl (1,2-diphenylethane) was isolated from the solution by gas-liquid-chromatography and was identified by retention time using gas-liquid chromatography, infrared absorption spectrum and mixed melting point with known bibenzyl.

EXAMPLE 10

10 cc./minute oxygen was bubbled through an 18.5 centimeter long column of molten lead at 500° in a ¾" I.D. stainless steel reactor. After about one hour, with the oxygen flow continuing, propylene was bubbled through the upper 1.5 centimeters of the column for about 30 minutes. The exit gas contained 0.39% 1,5-hexadiene, 3% carbon dioxide, and 0.73% $O_2$. On the basis of propylene reacted, a 1,5-hexadiene yield of 44% was obtained.

EXAMPLE 11

A tubular stainless steel reactor was completely filled with the catalyst described in Example 8. 94.2% acetonitrile and 5.8% $O_2$ were passed over the catalyst which was heated to 570°±10°. The gases were introduced at one atmosphere gauge, providing a residence time of about 0.01 sec. in the reactor.

The reactor exit product was condensed and unreacted acetonitrile and light fractions were distilled off the condensed effluent. In the residue succinonitrile was identified by retention time using gas-liquid chromatography. The material which was purified by gas-liquid chromatography was also identified as succinonitrile by its infrared absorption spectrum.

EXAMPLE 12

A tubular stainless steel reactor was completely filled with a catalyst prepared in accordance with Example 1, the catalyst in the present example having $5.9 \times 10^{-3}$ mol Pb/cc. of catalyst. The furnace was heated to 645°±10°, 93.4% acetic acid and 6.7% $O_2$ were passed over the catalyst at atmospheric pressure, providing a residence time of about 0.02 sec.

After distilling unreacted acetic acid and light fractions off the condensed reactor effluent, the residue was esterified with ethanol. Diethyl succinate was isolated and purified and identified by gas-liquid chromatography and by its infrared absorption spectrum.

We claim:
1. A process which comprises
   (a) dehydrodimerizing in the vapor phase a reactant having the formula Y—CH₃ wherein Y is a substituent selected from the group consisting of
      (1) a substituent having the formula

wherein R represents a hydrogen, methyl or phenyl substituent,
      (2) a phenyl substituent,
      (3) a cyano substituent, and
      (4) a carboxyl substituent at a temperature within the range of 300–800° C. in the presence of a catalyst and oxidant for dehydrodimerization consisting essentially of,
         (1) a metal oxide selected from the group consisting of lead oxide, cadmium oxide and thallium oxide, and
         (2) from 0–10% oxygen by volume based on the total initial volume of oxygen and reactant, and
   (b) recovering as product a compound having the formula

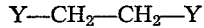

wherein Y corresponds to the Y substituent of the reactant.

2. The process of claim 1 wherein the reactant is propylene and the product is 1,5-hexadiene.

3. The process of claim 1 wherein the reactant is isobutylene and the product is 2,5-dimethyl-1,5-hexadiene.

4. The process of claim 1 wherein the reactant is alpha-methyl styrene nad the product is 2,5-diphenyl-1,5-hexadiene.

5. The process of claim 1 wherein the reactant is toluene and the product is 1,2-diphenylethane.

6. The process of claim 1 wherein the reactant is acetonitrile and the product is succinonitrile.

7. The process of claim 1 wherein the reactant is acetic acid and the product is succinic acid.

8. The process of claim 1 wherein the reactant is dehydrodimerized in the presence of the metal oxide for a period of 0.008–10 seconds and the metal oxide is placed on a catalytic support which is selected from the group consisting of activated alumina, diatomaceous earth and firebrick.

References Cited
UNITED STATES PATENTS

| 2,627,527 | 2/1953 | Connolly et al. | 260—604 |
| 3,184,415 | 5/1965 | Huntley et al. | 252—461 |
| 3,308,185 | 3/1967 | Bajars | 260—680 |
| 2,244,645 | 6/1941 | Jacobson | 260—465 XR |
| 3,211,800 | 10/1965 | Bajars | 260—680 |

PAUL M. COUGHLAN, JR., Primary Examiner

U.S. Cl. X.R.
260—537, 668, 669, 680

PO-1050
(5/69)

UNITED STATES PATENT OFFICE
CERTIFICATE OF CORRECTION

Patent No. 3,494,956      Dated February 10, 1970

Inventor(s) Phillip A. Greene, Edward J. Buyalos, and David E. Scheirer

It is certified that error appears in the above-identified patent and that said Letters Patent are hereby corrected as shown below:

Column 3, line 32, "proylene" should be --propylene--.

Column 3, line 39, "hexadient" should be --hexadiene--.

Column 3, line 52, "hexadient" should be --hexadiene--.

Column 5, line 1, after "styrene" insert a space.

Column 5, line 3, "150" should be --15°--.

Claim 6, column 6, line 35, "nad" should be --and--.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents